Jan. 28, 1969  R. B. MILLER  3,424,612
SUGARCANE PROCESSING AND APPARATUS
Filed July 1, 1965  Sheet 1 of 5

INVENTOR
ROBERT B. MILLER

ATTORNEYS

Jan. 28, 1969   R. B. MILLER   3,424,612
SUGARCANE PROCESSING AND APPARATUS
Filed July 1, 1965

INVENTOR
ROBERT B. MILLER
ATTORNEYS

Jan. 28, 1969 R. B. MILLER 3,424,612
SUGARCANE PROCESSING AND APPARATUS
Filed July 1, 1965 Sheet 3 of 5

INVENTOR
ROBERT B. MILLER
BY
ATTORNEYS

INVENTOR
ROBERT B. MILLER

ATTORNEYS

United States Patent Office 3,424,612
Patented Jan. 28, 1969

3,424,612
SUGARCANE PROCESSING AND APPARATUS
Robert B. Miller, 12540 126th Ave.,
Edmonton, Alberta, Canada
Continuation-in-part of application Ser. No. 384,410, July 22, 1964. This application July 1, 1965, Ser. No. 468,692
U.S. Cl. 127—2          10 Claims
Int. Cl. C13d 1/06

ABSTRACT OF THE DISCLOSURE

Methods and apparatus for obtaining sugar from sugarcane involving the separation of sugarcane pith from sugarcane rind and the expulsion of juice from the rind-free pith.

---

This application is a continuation-in-part of copending application Ser. No. 384,410, filed July 22, 1964.

This invention relates to a method and apparatus for handling sugarcane stalks, and like stalks, and for converting the stalks into the components thereof.

Conventional sugarcane processing equipment provides for the bulk handling of stalks after the sugarcane has been cut and brought to the mill where the processing occurs. The primary operation in the initial stages of processing sugarcane is to subject bulk quantities of cane stalks to a crushing and grinding action in order to remove as great a percentage of the juice present in the stalks as is economically possible. This step is referred to as milling and normally is carried out by a series of three roller mills. In such mills, the entire cane stalk is shredded and crushed violently in order to break through the hard rind to rupture the pith cells and to extract therefrom the juice containing the valuable sugar. Usually, there are a series of the three to five roller mills, making up a train, the crushed stalks passing in series from mill to mill to make sure that the most efficient extraction of the juice has been obtained. The power requirements for running such mills is tremendous. To aid in the milling operation, the crushed stalks are steeped or wetted with water in intermediate stages of the crushing operation.

By this conventional milling operation, there is produced: (1) a dilute, contaminated juice which is processed further into sugar products, and (2) bagasse, a soggy, pulp-like material comprised of intermingled crushed and broken fiber pieces of the sugarcane stalk and the pulpous pith from the inner part of the stalk. The bagasse has little value. At most mills it is burned as fuel. Considerable effort has been expended to find ways to utilize bagasse, but still the disposal of bagasse is a serious problem.

The primary object of this invention is to provide an improved method and improved apparatus for handling sugarcane, which apparatus is a considerable departure from conventional sugarcane milling apparatus and which avoids the drawbacks and problems encountered with conventional apparatus. The apparatus of this invention simplifies the sugarcane processing operation, and further, as compared with conventional milling apparatus, provides for reduced power requirements, reduced initial costs, and reduced maintenance. Furthermore, and of considerable significance, is that this apparatus provides for total conversion of sugarcane stalk into its components in such form as to make these components valuable commodities.

In brief, this invention contemplates a series of stations at which the sugarcane stalk is treated. Each stalk is handled separately and is propelled with continuous motion through the apparatus; that is, a whole stalk is introduced into the apparatus and as the apparatus runs continuously, the stalk is separated into various components; for example, wax, epidermis, rind and pith from which the juice may subsequently be separated. A series of guide and drive roller assemblies are provided for propelling the stalk in such a manner as to forcefully advance the stalk to the various stations, but so as not to significantly compress or squeeze the rind in a transverse or radial direction.

At one station an assembly of flexible members in the form of tines, arranged to provide an automatically adjustable iris diaphragm, removes wax from the outer surface of the whole cane stalk. At a second station, a similar assembly of tines removes epidermis and loose fibers from the outer surface of the whole cane stalk. A splitter assembly cuts the whole cane stalk after which a divider and turner assembly aligns the stalk halves for entry into a depither assembly. The pith and the outer rind of the stalk are separated by the depithing assembly in such a manner that a major portion of the juice is retained in the pith and the fibers of the rind portion of the stalk are relatively undisturbed. The rind, in strip form, is washed and squeezed to remove therefrom residual juice, after which the rind is chemically treated.

This invention is explained further with reference to the accompanying drawings in which.

Figure 1:
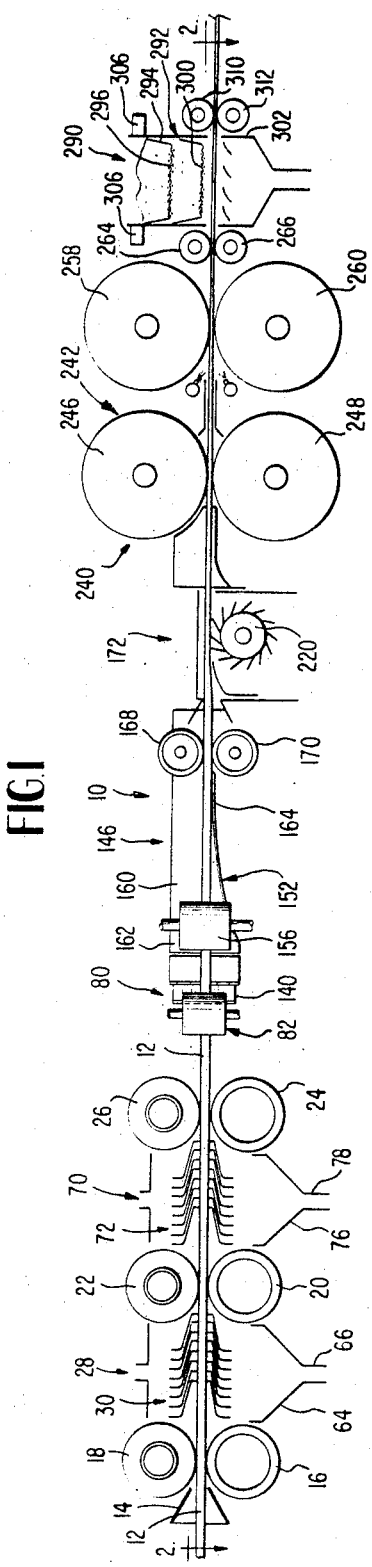
FIGURE 1 is a side elevation view showing diagrammatically the apparatus of this invention; for clarity, parts have been omitted, and certain parts are shown in cross-section.
Figure 2:
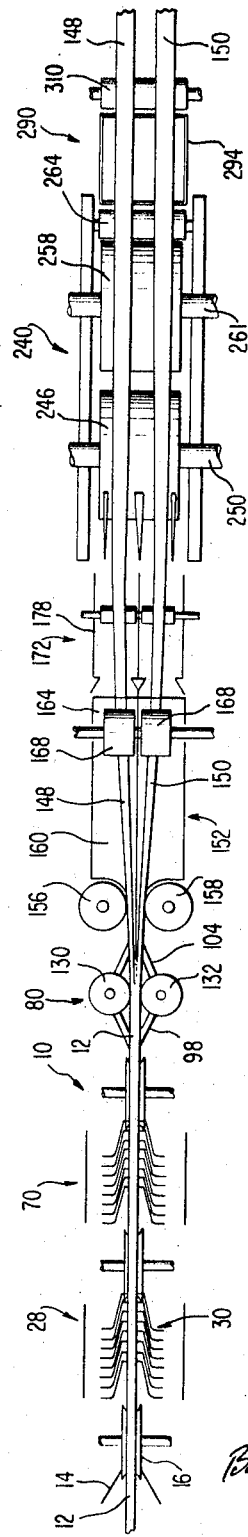
FIGURE 2 is a plan view, generally in cross-section, corresponding with FIGURE 1 and taken along line 2—2 thereof.

The general arrangement of the sugarcane processing apparatus 10 of this invention is shown in FIGURES 1 and 2. A series of treating stations for performing different operations on the sugarcane stalk are aligned generally longitudinally. Stalks, one at a time, are introduced into the apparatus 10 and each stalk is propelled therethrough in continuous rapid movement. As each stalk 12 progresses through the apparatus, it is separated into basic components; namely, wax, epidermis including loose outer fibers, pith with a major portion of the juice retained therein, and rind fiber. These components may be processed further for ultimate utilization of all of the components of the sugarcane stalk.

A whole sugarcane stalk 12 is fed into the front of the apparatus 10, preferably after being de-leaved and washed. Suitable means such as a funnel-shaped device 14 may be employed to guide the stalk 12 which is gripped immediately between a first pair of power-driven rollers 16 and 18. The lower roller 16 has a concave groove extending circumferentially therearound, while the upper roller 18 preferaby has a flexible surface and resembles a pneumatic tire. The rollers 16 and 18 cooperate to guide and propel the stalk forward. A second pair of rollers 20 and 22 and a third pair of rollers 24 and 26 are similar in construction to the first pair of rollers 16 and 18; and like the first pair of rollers, assist in guiding and propelling the stalk in a path rapidly through the apparatus 10.

Figure 3:
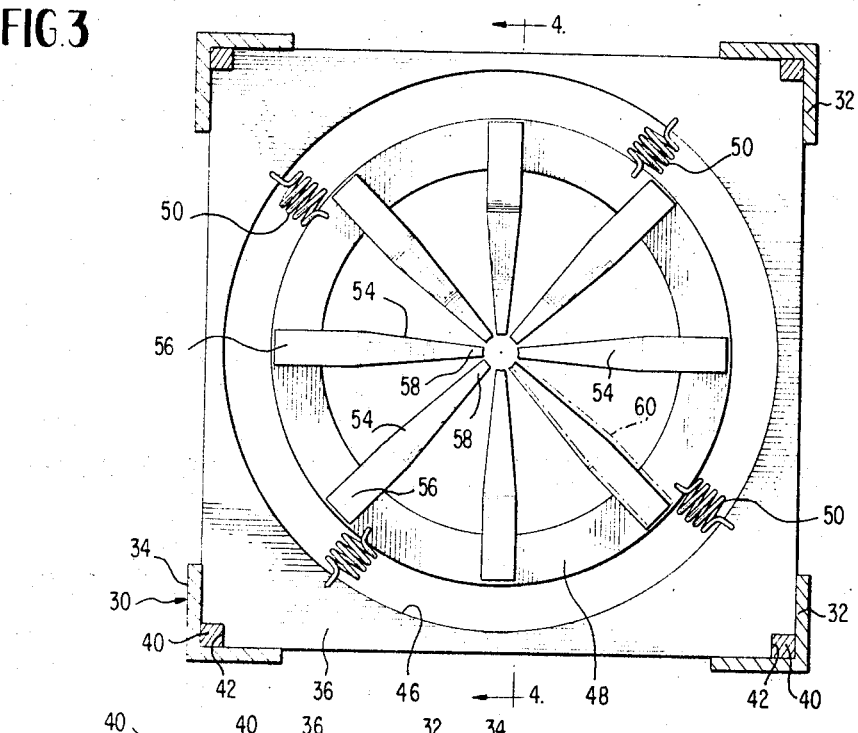
FIGURE 3 is an end elevation view of a tine box assembly.
Figure 4:
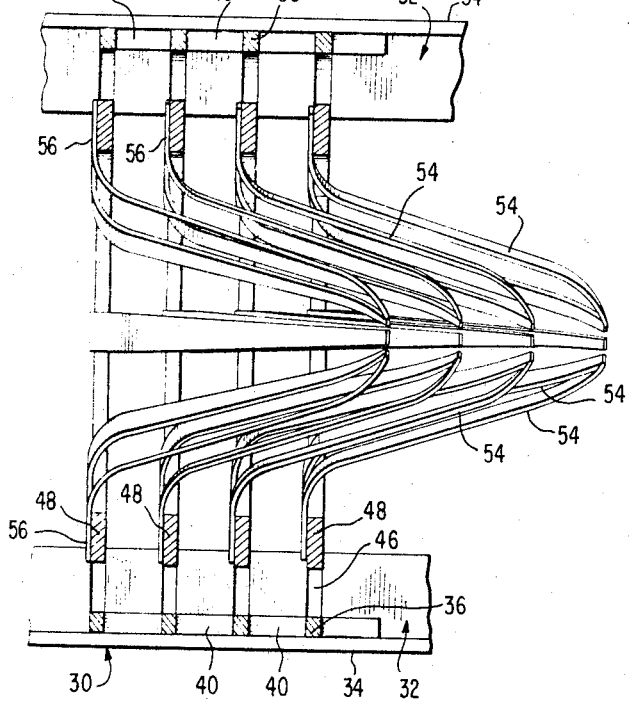
FIGURE 4 is a plan view in cross-section taken along line 4—4 of FIGURE 3.

The whole sugarcane stalk 12 is propelled to a first treating station 28 at which the outer or cuticle wax is removed. This station comprises a tine box assembly 30, shown in detail in FIGURES 3 and 4, which includes a suitable frame structure 32 of unitary box-like construction, including channel-shaped members 34 providing open sides. A series of plates 36 are spaced-apart longitudinally of the apparatus 10, that is along the path of the moving sugarcane stalk 12 and held in position by spacer elements and tracks 40 in the members 34 cooperating with notches 42 at the corners of the plates 36. Each plate 36 has a large, centrally located opening 46 within which is suspended a flat ring 48 having an outer diameter somewhat smaller than the diameter of the opening 46. A series of flexible elements, such as coiled tension springs 50, extend at circumferentially spaced points between the ring 48 and the plate 36 to serve as the sole support for the ring, thereby allowing the ring to shift transversely of the path of the moving sugarcane stalk 12 and to have universal movement with respect to the path.

A series of flexible members in the form of tines 54 made of rigid but pliant material such as spring metal are formed in an S-shape and mounted on each ring 48. The forward end 56 of each tine 54 extends over the forward face of the ring 48 and is mounted thereto by welding or by use of removable fastener means. The several tines 54 extend through and rearward of the corresponding ring 48 in cone-like configuration to receive therebetween the whole sugarcane stalk 12 as it is propelled rapidly through the apparatus 10. The rearward ends 58 of the tines 54 extend generally perpendicularly with respect to the path of the stalk and cooperate to form an opening or iris diaphragm which, by nature of the spring metal from which the tines 54 are made, and the S-shape configuration, can be adjusted automatically as to size upon passage of the whole stalk therethrough. The rearward edge of each end 58 of the several tines 54 are sharpened and are curved to provide a brushing or scraping surface for direct engagement with the outer surface of the passing stalk.

Each of the several rings 48 of the tine box assembly 30 is provided with a series of these circumferentially spaced, rearwardly extending tines 54 which overlap lengthwise. As between the several rings 48 in the assembly 30, however, the relative radial position of the tines 54 on the different rings 48 is adjusted a few degrees so that the tines overlap but also extend radially beyond one another, in offset or staggered fashion, as represented at 60. This assures that, as a stalk passes through the tine box assembly 30, the entire surface of the stalk will be engaged and scraped by several sharp edges of the tines. A sufficiently large number of rings 48 with tines 54 should be used to allow for adequate scraping of the stalk to remove a significant amount of the cuticle wax.

The tine box assembly 30 is located within a housing 64. The cuticle wax, which is in the form of dust or powder, is removed from the assembly 30 through the open sides thereof and is retained within the housing from which it may be removed by a flow of air at 66 and then collected for further processing.

The next station 70 at which the moving stalk is treated comprises a tine box assembly 72 of substantially identical construction as the tine box assembly 30. At station 70, the epidermis and fibers adhering loosely to the outer surface of the stalk are removed possibly along with some additional wax. The difference between the tine box assembly 30 and the tine box assembly 72 is the characteristic of the tines and the normal size of the iris diaphragm. The several tines 54 of the tine box assembly 30 are somewhat more flexible than the tines of the second assembly 72 and the diameter of the iris diaphragm provided by the tines 54 of the assembly 30 is somewhat larger than the corresponding iris diaphragm of the second assembly 72. The tine box assembly 72 is located within a housing 76 which retains the epidermis and other material removed from the stalk which, in turn, is removed by a flow of air at 78 and collected for further processing.

Station 28 is intended to remove from the stalk and collect a significant amount of the cuticle wax as possible, without including any more of the other matter on the outside of the stalk than is necessary. The characteristics of the tines 54 of the tine box assembly 30 are determined with this purpose in mind. On the other hand, station 70 removes from the stalk all such remaining material, as the epidermis, which is extraneous to the hard rind fibers and serves to clean dirt and debris from the exterior of the stalk without breaking or otherwise damaging the rind fibers. Accordingly, the characteristics of the tines 54 of tine box assembly 72 should be determined with this purpose in mind.

Figure 5:
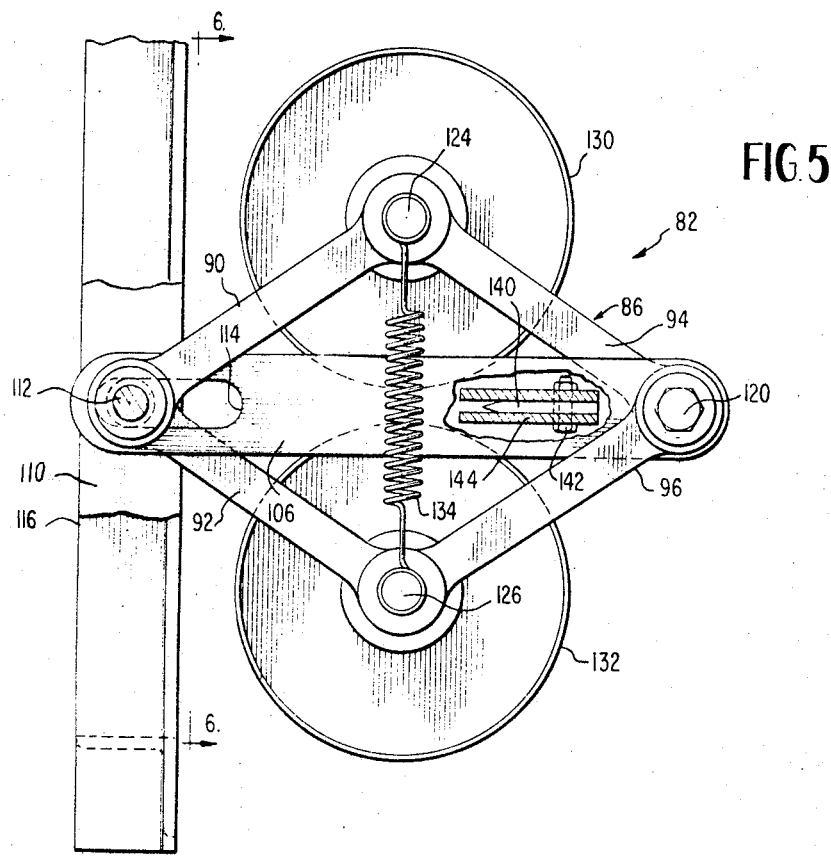
FIGURE 5 is a plan view of a splitter assembly.
Figure 6:
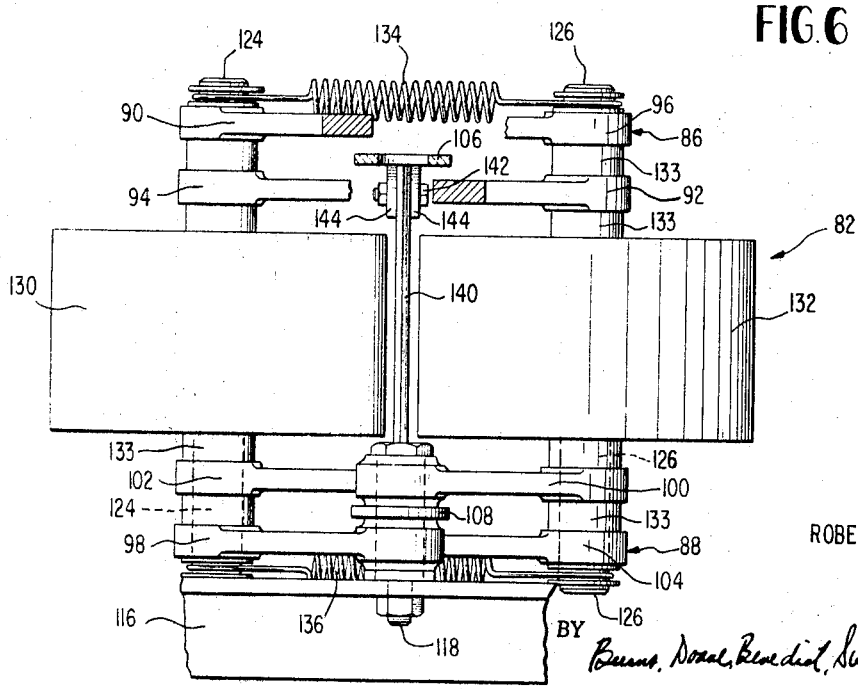
FIGURE 6 is a an end elevation view in cross-section of the splitter assembly of FIGURE 5 taken generally along line 6—6 thereof.

The whole sugarcane stalk 12 with the outer surface thereof having been cleaned is propelled by the rollers 24 and 26 to a third station 80 comprising an articulated splitter assembly 82, FIGURES 5 and 6, which serves to sever or cut the whole stalk 12 in half endwise. The splitter assembly 82 includes an upper flexible arm assembly 86 and a lower flexible arm assembly 88, the two of which assemblies are substantially identical. The upper assembly 86 includes front arms 90 and 92 and rear arms 94 and 96; the lower assembly 88 includes corresponding front arms 98 and 100 and rear arms 102 and 104. The arms of the assemblies are arranged in parallelogram fashion. Each arm assembly 86 and 88 has associated therewith an upper slide plate 106 and a lower slide plate 108, respectively.

The front arms 90 and 92 of the upper assembly 86 and the upper slide plate 106 are pivotally mounted to a stationary cross member 110 of the apparatus 10 by a bolt 112. The front of the upper slide plate 106 has a slotted opening 114 receiving the bolt 112 so that plate 106 may slide forward from its position shown in FIGURE 5 as well as pivot about the bolt. In a similar manner, the front arms 98 and 100 of the lower assembly 88 and the lower slide plate 108 are pivotally mounted to another stationary cross member 116 of the apparatus 10 by a bolt 118.

The rear arms 94 and 96 and the upper slide plate 106 are pivotally joined by a rear bolt 120, and in similar manner the rear arms 102 and 104 and the lower slide plate 108 are pivotally joined by a lower rear bolt (not shown). The rear bolt 120 and the corresponding lower rear bolt are movable together toward the bolts 112 and 118 as the slide plates 106 and 108 move forward and also are adapted to swing in an arc about the bolts 112 and 118.

The front arm 90 and the rear arm 94 of the upper assembly 86 are pivotally joined by a vertical shaft 124 which extends downwardly to pivotally join the front arm 98 and the rear arm 102 of the lower assembly 88 along a common axis. Similarly, the front arm 92 and the rear arm 96 are pivotally joined by a vertical shaft 126 which extends downwardly to pivotally join the front arm 100 and the rear arm 104 along a common axis spaced transversely of the path of the moving stalk 12 opposite the shaft 124.

A guide drum 130 is mounted for rotation about the shaft 124 and a guide drum 132 is mounted for rotation about the shaft 126. Spacers 133 are provided as necessary. An upper tension spring 134 and a lower tension spring 136 extend between and constantly urge the shafts 124 and 126 together. A splitter blade 140 extends vertically between the upper slide plate 106 and the lower slide plate 108 and is removably mounted by bolts 142 to holder elements 144 fixed to the respective slide plates. The blade 140 is located rearwardly and centrally of the drums 130 and 132.

The articulate nature of the splitter assembly 82 accommodates the twisted and distorted configuration of the stalks of sugarcane and assures that the stalks will be severed into two substantially equal, longitudinal sections regardless of the severity of the kinks or bends in the stalk. In operation, the moving stalk engages the drums 130 and 132, and, depending on the twists and curves therein, forces the entire splitter assembly 82 to swing one way or the other about the vertical axes of the front bolts 112 and 118. The stalk forces the drums 130 and 132 apart against the force of the springs 134 and 136. This spreading force draws the slide plates 106 and 108 forward due to the scissor action of the upper and lower arms assemblies, but the splitter blade 140 always will remain centrally located between the drums 130 and 132 regardless of the diameter of the stalk and regardless of the extent of its crookedness. Further, the articulate nature of the splitter assembly 82 offers limited resistance to the movement of the stalk.

At the next preceding station 146, the two halves of sugarcane stalk 148 and 150 are spread apart and turned by a half-cane turner assembly 152 which serves to twist the two stalk halves 148 and 150 about one-quarter turn so that the pith or inner portions face downwardly and the outer curved rind portions face upwardly. The turner assembly 152 includes a pair of guide rollers 156 and 158 spaced apart to receive the stalk halves 148 and 150 therebetween and which may rotate freely about vertical axes. Immediately following the rollers 156 and 158 there is positioned a turner member 160 having a vertically extending thin plate portion 162 facing the direction from which the stalk halves 148 and 150 come. The opposite sides of the plate portion 162 gradually curve into a horizontally extending plate portion 164. The stalk halves engage and slide along the sides of the vertical portion 162 and by the time they reach the horizontal portion 164, they are properly positioned. At the rear of the turner member 160 the stalk halves 148 and 150 are received between a pair of rollers 168 and 170 which serve to guide and propel the stalk halves through the apparatus.

The next station 172 at which the stalk halves are treated comprises a depither assembly 174 at which the pith is separated from the rind of the stalk without removing from the pith a significant amount of juice and further without breaking or otherwise destroying the natural strength and relative disposition of the rind fibers.

Figure 7:
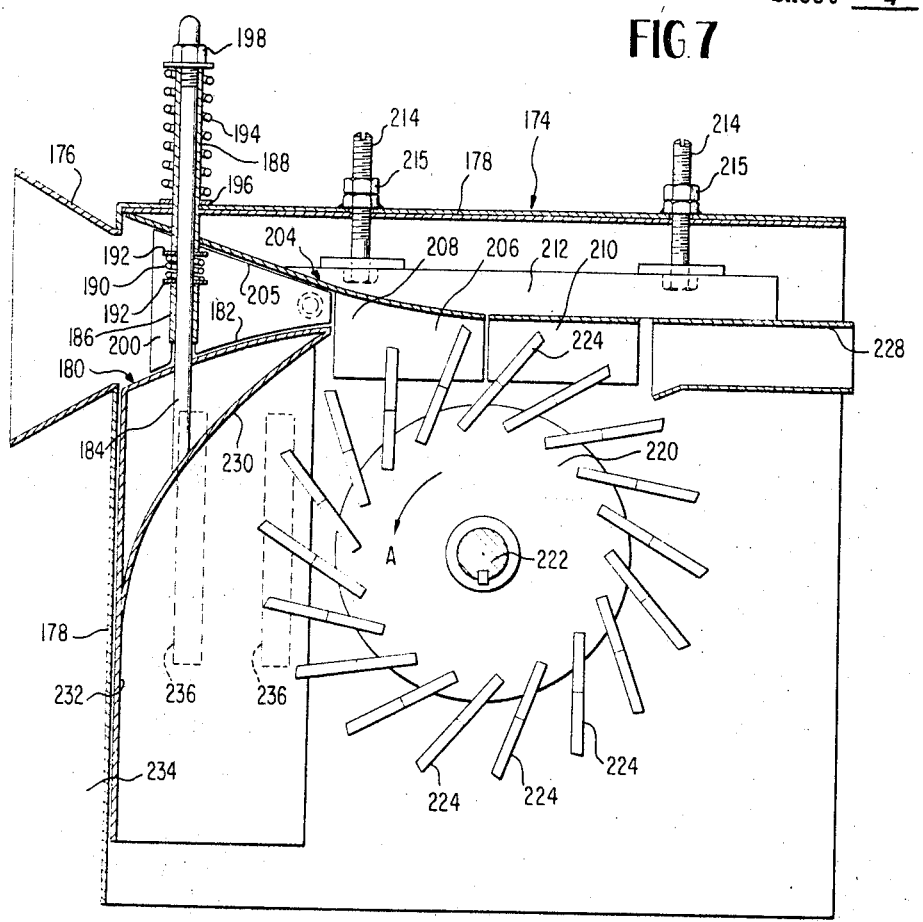
FIGURE 7 is a side elevation view in cross-section of a depither assembly.

The depither assembly 174, as shown in detail in FIGURE 7, includes a funnel-shaped guide 176 for receiving and guiding the stalk halves 148 and 150 into the depither assembly 174. A suitable housing structure 178 surrounds the members of the assembly 174 for supporting the members as a unit and for receiving pith as it is loosened from the rind.

Immediately to the rear of the funnel-shaped guide 176 and within the housing 178 is a platform member 180 having a slightly curved floor portion 182 extending rearwardly of the guide 176. The platform member 180 is mounted within the housing 178 to have vertical movement with respect to the path of the moving stalk halves. Such movement is provided by a rod 184 that is fixed to the platform member 180 to extend vertically above the housing 178. A lower sleeve 186 surrounds the rod 184 and is fixed to the platform member 180. An upper sleeve 188 is fixed to the housing 178 and slidably receives the upper part of the rod 184 above the housing. A lower compression spring 190 surrounds the rod 184 between the lower sleeve 186 and the upper sleeve 188 and bears against washers 192 to force the sleeves 186 and 188 apart longitudinally. An upper compression spring 194 surrounds the upper sleeve 188 and bears against the housing at 196 and a cap 198 threaded on the uppermost end of the rod 184 to force the rod upwardly.

The platform member 180 has vertically extending sides 200 spaced-apart transversely of the path of the moving stalk halves and serving to guide the halves. Above the floor portion 182 of the platform member 180, the housing is provided with an upper guide 204 having a surface 205 extending downwardly from the funnel-shaped guide 176. The rear portion of the upper guide 204 has a depending stalk folder 206 which is flared outwardly at the front portion 208 and which is generally semi-circular in cross-section to receive one of the stalk halves and which has an inner surface generally of the same dimension corresponding generally to the outside dimension of stalk halves, as shown in FIGURE 7. There are two such folders 206 mounted side by side on the upper guide 204, each one receiving one of the two stalk halves 148 and 150.

Following, and aligned longitudinally with each stalk folder 206, is a secondary stalk folder 210, generally of the same cross-sectional configuration and dimensions as the folder 206, as shown in FIGURE 7. The secondary folder 210 is mounted to a bar 212 which in turn is adjustably connected to the housing 174 by threaded connectors 214 held by nuts 215.

Below each stalk folder 206 and secondary folder 210 is a depithing wheel 220 which is mounted for rapid rotation on a power drive axle 222 extending transversely of the path of the moving stalk halves. The wheel 220 is provided with a plurality of radially extending blades 224 positioned at generally equally spaced points around the periphery of the wheel. The outermost edge 226 of the blades conform generally to the same configuration as the inner surfaces of the stalk folder 206 and the secondary folder 210. The wheel 220 is positioned such that the several blades 224, upon rotation of the wheel, pass through the stalk folder 206 and the secondary folder 210. The wheel 220 rotates in the direction indicated by arrow A of FIGURE 7 such that the blades 224 pass in tangential fashion with respect to the uppermost surface of the stalk folder 206 and secondary folder 210 in the direction toward the oncoming stalk halves. Different blade structures may be employed. The particular structure shown is merely representative.

Figure 8:
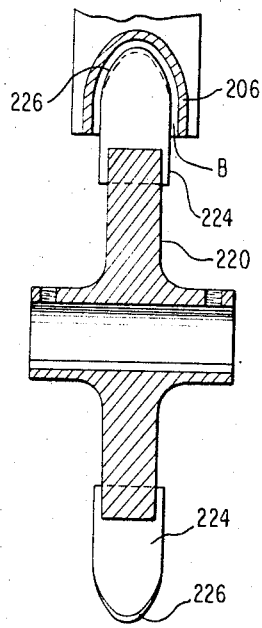
FIGURE 8 is an end elevation view in cross-section of a depither wheel of a depither assembly and showing a portion thereof.
Figure 9:
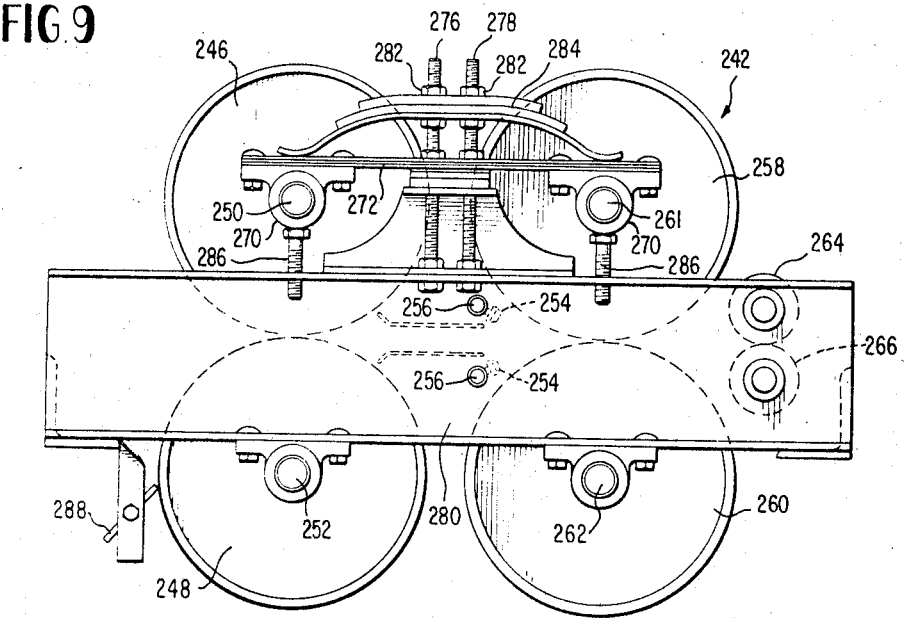
FIGURE 9 is a side elevation view of a rind wash assembly.
Figure 10:
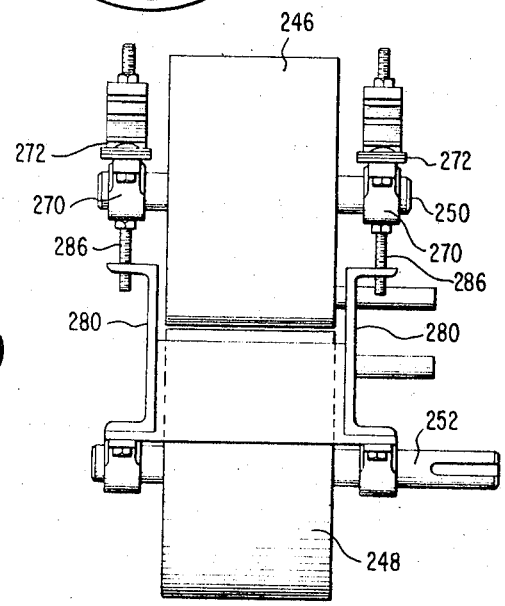
FIGURE 10 is an end elevation view of the rind wash assembly of FIGURE 9.

The wheel 220 is positioned so as to leave a space between the curved inner surfaces of the stalk folder 206 and the secondary folder 210 as indicated at B, FIGURE 8. The rind of the stalk moves through this space without being contacted to any substantial extent by the blades 224 while the blades engage the oncoming pith and, in effect, gently tear away the pith from the rind. The depth or thickness of the space B can be varied by adjusting the nuts 215 to change the position of the bar 212 with respect to the wheel 220. The space B will determine the thickness of the rind after passing the wheel 220. A follower guide 228 receives the depithed rind strips at the rear of the depither assembly and, like the stalk folder 206 and 210, is semi-circular in cross-section.

Beneath the curved floor portion 182 of the platform 180, there is a collector plate 230 sloping downwardly between a front panel 232 and side panels 234 of the platform 180. Suitable tracks 236 on the side panels 234 assist in guiding the platform 180 during vertical movement. As the wheel 220 rotates rapidly, pith removed from the rind is carried forwardly by the blades and hurled against the collector plate 230 and then drops to a collection device. This pith cotnains a major part of the juice of the sugarcane.

The downwardly sloped surface 205 of the upper guide 206 and the relative longitudinal spacing with respect to the uppermost extent of the blades is significant in reducing strain on the rind which might cause the rind to be torn longitudinally or broken crosswise, a situation that could interrupt continuous operation of the apparatus. Also this feature reduces a buildup of pith coming into engagement with the rotating blades 224 and thereby eliminates a back pressure, so to speak, within the pith. The automatic vertical movement of the platform 180 serves to continuously force the stalk halves upwardly to properly position them for the blades 224 and to assure that the rind will pass precisely through the space B without contact by the blades 224. After falling from the depithing assembly 174, the pith is collected and transferred for further process where the valuable sugar juice is removed from the pith.

The rind, in curved strip form, moves from the depither assembly 174 to the next station 240 comprising an expresser assembly 242 for removing from the rind any juice retained therein. The expresser assembly 242 includes a first pair of rollers 246 and 248 rotatable about horizontal shafts 250 and 252. The rollers squeeze and flatten the rind and express therefrom any natural juice. The rind then passes a spray assembly having nozzles 254 for dispensing a mist of water from a conduit 256 onto the passing rind. Then the moist rind strips pass between a second pair of rollers 258 and 260 mounted on shafts 261 and 262 where the added moisture is squeezed from the rind along with sugar which might be leached from the rind by the added moisture. A pair of final wringer rollers 264 and 266 follow the rollers 258 and 260. The liquid squeezed from the rind by the pairs of rollers 246 and 248, 258 and 260, and 264 and 266 is collected and sent to further processing for recovery of the sugar therein. As an alternative to the squeezing procedure, the rind may be subjected to diffusion, wherein water is caused to flow over and through the rind in order to dissolve out the sugar after which the sugar is recovered from the water.

The axles 250 and 261 of the upper rollers 246 and 258 are mounted by bearing blocks 270 to a bar 272 which is supported by bolts 274 and 276 on a side member 280. Nuts 282 can be adjusted to vary the force that a leaf spring 284 applies downwardly to opposite ends of the bar 272. The leaf spring 284 assures that sufficient pressure will be applied to squeeze the rind. Downward movement of the rollers 246 and 258 is limited by stop bolts 286 to provide suitable clearance between the pairs of rollers so that the rind fiber will not be damaged. The lower shafts 252 and 262 are power driven to propel the rind through the apparatus. A scraper blade 288 removes moisture from the surface of the roller 248, and additional such blades may be used where appropriate.

A final rind treatment station 290 may follow the expresser assembly 242 for chemically treating the rind strips to prevent deterioration or to fireproof the rind. This may include an applicator assembly 292 having a tray 294 located above the rind strips with a perforated vibrating bottom 296 and holding a supply of treating material such as powdered borax or the like. A vibrating screen 300 beneath the tray 294 assures even distribution of the treating material over the rind. The tray 294 and the screen 300 are held within a housing 302 through which the rind passes. A funnel-shaped bottom of the housing collects the excess treating material. Vibrator devices 306 may be attached on the housing 302 to provide the vibrating motion for the tray bottom 296 and the screen 300. A pair of rollers 310 and 312 help propel the rind strips and assure continuous movement of the rind from the chemical treatment station 290. As an alternative to the use of a powder, a treating material may be applied to the rind when in liquid form as by spraying the material on the rind or by dipping the rind in the liquid. Thereafter the rind may be collected for further handling.

The apparatus of this invention is a significant departure from conventional sugarcane milling apparatus, and in fact, represents an entirely different concept for sugarcane handling. Instead of milling the cane so that it contains contaminants from the field as well as impurities from the rind, this invention provides radically different sugarcane separation apparatus which retains the juice in substantially uncontaminated form thereby significantly enhancing the sugar refining processes. Those skilled in the art will readily appreciate the desirability of reducing the juice contaminants and increasing the Brix value of the raw juice.

The novel process disclosed herein regarding the handling of sugarcane includes, first the removal and collection of wax from the outer surface of whole sugarcane stalk, which step also removes trash and other loose extraneous matter clinging to the outside of the stalk. This is accomplished, for example, by passing the whole stalk through an orifice or opening of predetermined size but adjustable to accommodate the stalk in such fashion as to remove a major portion of the wax without removing or disturbing a substantial amount of the epidermis or rind.

The next step is to remove and collect the epidermis by passing whole sugarcane stalk with the wax removed through a second surface or opening of predetermined size and also adjustable to accommodate the stalk in such fashion as to remove the epidermis from the rind. This leaves the hard, strong fibers of the rind exposed on the outside of the stalk.

Next, the whole stalk is split lengthwise, that is along its longitudinal dimension, into two sections that are substantially semicircular in cross-section. Then, the stalk halves are turned and aligned with the flat portions, that is the portions with the pith exposed, facing the same direction, preferably downwardly.

The rind and pith are then separated, for example, by moving the halves past rapidly rotating blades which engage and, in effect, sweep the pith away from the rind without engaging or disturbing the rind fibers. Carefully controlled guiding and supporting of the stalk halves past the blades is important. The halves, in effect, are floated or stalled into the blades by the combined action of three forces. (1) Each half is propelled rapidly in a generally horizontal direction toward the blades. (2) A fixed guide forces the leading end of the moving half downwardly into tangential alignment with the blades; and because the stalk half is rigid longitudinally, the major portion of the half, as it approaches the blades, remains generally horizontally disposed. (3) A constant spring force is applied upwardly against the half in front of the blades. This keeps the half resiliently biased upwardly in tangential alignment with the blades and prevents the stalk half from hitting the blades head on. Preferably the blades rotate against the oncoming pith.

The pith, which contains a major portion of the juice, is collected from the blades and sent to further processing. The previously described operations are performed on the rind without changing the original, natural shape of the rind, that is, without significantly moving the rind fibers with respect to one another. Removal of the pith from the rind occurs, for example, when the rind is curved. This maintaining of the stalk in curved configuration provides for control regarding the separation of the components, particularly the separation of the pith and the rind without causing separation of the juice from the pith.

Next, the rind strips are flattened and pressed by passing them between a first set of rotating rollers in order to shape the strips and to squeeze out juice. A controlled amount of water is then added to the strips and they are squeezed again to remove any remaining sugar. This wetting and wringing operation may be repeated as necessary in order to remove as much of the sugar from the rind as possible. The rind may be subjected to diffusion, as an alternative. After this, the rind is treated chemically to prevent deterioration, dried and then collected.

Of considerable significance regarding the advantages of the method and apparatus of the invention is the production of different components of the sugarcane stalk, including wax, epidermis and rind fibers, in addition to the juice laden pith. These components are in a form suitable for economical processing into valuable products. The wax may be refined, for example, and the rind fiber can be used readily in the production of construction board, just to mention one use. Compared with the production of bagasse with results from conventional sugarcane milling practices, the separation of sugarcane into components affords many significant advantages.

Various changes and modifications of the apparatus disclosed will become apparent to those skilled in the art. The foregoing description is intended to be exemplary only and the scope of the invention is to be determined from the following claims.

I claim:
1. A process for separating sugarcane stalk into components comprising performing the following steps sequentially on the stalk: scraping wax from the outside of the stalk, scraping epidermis from the outside of the stalk, splitting the stalk lengthwise, scraping the pith away from the rind of the stalk with blade means, flattening the rind, and removing the juice in the rind from the rind.

2. Apparatus for separating stalks into components comprising means for propelling a single stalk in a path longitudinally with respect thereto, first treating means in said path for receiving a stalk and applying a scraping action thereto as the stalk moves past to remove material from the surface of the stalk, said first treating means including a first set and a second set of scraping edges, said sets having different resiliency characteristics so that said sets remove material of different nature from the surface of the stalk, second treating means following the first treating means with respect to the path for splitting a stalk longitudinally, and third treating means following the second treating means with respect to the path for separating the pith of a stalk from the rind and including blade means having rotational movement into the path to engage the pith and carry the pith away from the rind.

3. Apparatus according to claim 2 wherein said stalk splitting, second treating means has blade means articulately mounted with respect to said path to engage the stalks substantially at their center in order to split the stalks into two substantially equal longitudinal sections.

4. Apparatus according to claim 2 wherein said means for separating the pith from the ring includes means for supporting the rind a predetermined distance from said blade means.

5. Apparatus according to claim 2 further including means for conditioning the rind after the path has been removed therefrom.

6. Apparatus for splitting moving cane stalk longitudinally, said apparatus comprising blade means, and means for supporting said blade means in the path of movement of a stalk, said supporting means including means engageable by a stalk to move the blade means in accordance with curves in a stalk to maintain the blade means in said path.

7. Apparatus as defined in claim 6 wherein the blade supporting means includes a parallelogram arm assembly, the arms of said parallelogram assembly being pivotally connected, one of the pivotal connections serving as an axis about which said movement of the blade means occurs.

8. Apparatus as defined in claim 6 wherein the means engageable by a stalk includes a pair of cooperating guide means, and further comprising pivotal plate means, the blade means being mounted on the plate means, said guide means being operatively connected to said plate means for movement of said plate means.

9. Apparatus for splitting moving cane stalk longitudinally, said apparatus comprising arm means in parallelogram arrangement and pivotally connected, means for supporting the arm means at a first one of the pivots, plate means pivotally and slideably mounted with respect to said first pivot and extending to the pivot opposite said first pivot in the parallelogram arrangement, blade means mounted on said plate means adapted to engage a stalk, and guide means on said arm means engageable by a stalk for moving the arm means, the plate means and the blade means in response to crookedness of the stalk for maintaining the blade means in the path of a moving stalk.

10. A process for separating sugarcane stalk into components comprising: splitting the stalk lengthwise, scraping the pith away from the rind of the stalk with blade means and flattening the rind, removing the juice in the rind from the rind, and prior to removing said juice scraping wax from the outside of the stalk and scraping epidermis from the outside of the stalk.

References Cited

UNITED STATES PATENTS

| 65,966 | 6/1867 | Tollinger | 130—31 |
| 623,753 | 4/1899 | Winchell | 130—31 |
| 632,789 | 9/1899 | Remy | 130—31 |
| 2,404,762 | 7/1946 | Zajotti et al. | 130—31 XR |
| 2,744,037 | 5/1956 | Lathrop | 127—43 |

FOREIGN PATENTS

| 9,121 | 8/1908 | France. |
| 321,285 | 11/1929 | Great Britain. |
| 348,806 | 12/1920 | Germany. |

OTHER REFERENCES

"The Technology of Sugar," by John G. M'Intosh (1915) pp. 290, 291.

MORRIS O. WOLK, Primary Examiner.

D. G. CONLIN, Assistant Examiner.

U.S. Cl. X.R.

127—42, 43; 130—31; 146—236